May 12, 1964 G. A. VAN DINE 3,133,259

HARMONIC SELECTIVE FILTER

Filed Aug. 26, 1960

INVENTOR
G. A. VAN DINE
BY
Ralph T. Holcomb
ATTORNEY 3,133,259
Patented May 12, 1964

3,133,259
HARMONIC SELECTIVE FILTER

Gilbert A. Van Dine, Hanover Township, Morris County, N.J., assignor to Bell Telephone Laboratories, Incorporated, New York, N.Y., a corporation of New York Filed Aug. 26, 1960, Ser. No. 52,308
2 Claims. (Cl. 333—70)

This invention relates to frequency selective filters and, more particularly, to filters which are selective as to harmonics of a fundamental frequency.

The object of the invention is to selectively pass even harmonics of the fundamental of a multifrequency input signal and to suppress the odd harmonics and the fundamental.

One frequency-doubling system makes use of a rectifying circuit to convert an input signal of frequency $f$ into an output signal containing the second and other even-order harmonics of $f$. The rectifying circuit may be of the full-wave type, with two rectifiers, or of the half-wave type, requiring only one rectifier, and may include means for suppressing frequencies above $2f$. In such a system any unwanted odd-order harmonics are suppressed in a special output filter in accordance with the present invention comprising a three-terminal delay line and two resistors each having a resistance equal to the characteristic impedance of the line. The line has negligible transmission loss and a constant delay equal to $½f$. If the input signal is not sufficiently pure, an input shaping network tuned to $f$ may be included. Thus, the output from the system is a sinusoidal signal of frequency $2f$.

Figure 1:
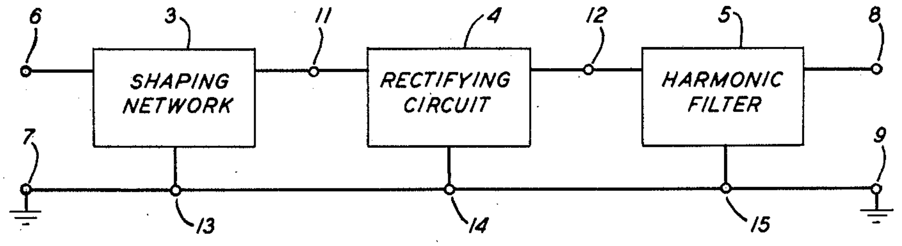
Figure 2:
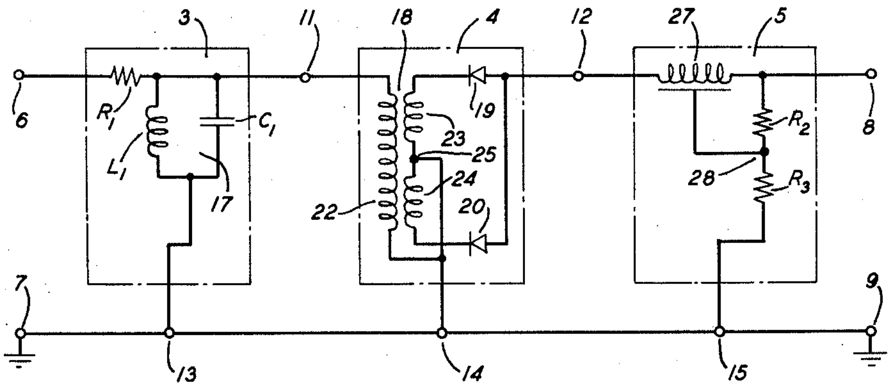

The nature of the invention and its various objects, features, and advantages will appear more fully in the following detailed description of a typical embodiment illustrated in the accompanying drawing, of which FIG. 1 is a block diagram of a frequency-doubling system in accordance with the invention; and FIG. 2 is a schematic circuit of an embodiment of the system shown in FIG. 1.

In FIG. 1, a shaping network 3, a rectifying circuit 4, and a harmonic filter 5 are connected in tandem between a pair of input terminals 6–7 and a pair of output terminals 8–9. The intermediate terminals are designated 11 through 15. Each of the networks 3, 4, and 5 is an unbalanced, three-terminal device. The terminals 7, 9, 13, 14, and 15 may be grounded as shown.

In the embodiment shown in FIG. 2, the shaping network 3 comprises a series resistor of value $R_1$ followed by a shunt branch 17 made up of an inductor of value $L_1$ and a capacitor of value $C_1$ connected in parallel. The reactances of $L_1$ and $C_1$ are equal in magnitude at the frequency $f$. The shunt branch 17 thus is resonant for and has an impedance peak at $f$. $R_1$ is preferably very much larger than $$\sqrt{L_1/C_1}$$

so that the input does not appreciably load the resonant circuit. Thus, when an input signal including the frequency $f$ is applied to the terminals 6–7, a substantially pure sine wave of frequency $f$ will appear at the terminals 11–13. If the input signal already has a satisfactory waveshape, the shaping network 3 may be omitted.

The rectifying circuit 4 comprises a transformer 18 and two rectifiers 19 and 20. The transformer 18 has a primary winding 22 and two equal secondary windings 23 and 24. The primary winding is connected to the output terminals 11 and 13 of the shaping network 3. The secondary windings 23 and 24 have a common terminal 25 which is connected to the grounded terminal 14. The other terminals of the windings 23 and 24 are connected, respectively, to the cathodes of the rectifiers 19 and 20. The anodes of the rectifiers 19 and 20 are connected together and to the intermediate terminal 12. The rectifying circuit 4 will operate equally well if both of the rectifiers 19 and 20 are reversed in polarity.

As shown, the rectifying circuit 4 is of the full-wave type. One of the half-wave type may be used, but this will reduce the output amplitude by half. The circuit may be converted into one of the half-wave type by omitting the secondary winding 24, the rectifier 20, and the connection between the rectifier 20 and the terminal 12.

The output signal from the circuit 4 at the terminals 12 and 14 contains the second harmonic frequency $2f$ and other even-order harmonics of $f$. Also, the fundamental frequency $f$ and odd-order harmonics are present in the output, if the secondary windings 23 and 24 are unbalanced or the rectifiers 19 and 20 are mismatched. If the second harmonic is the only desired output, means are included in the circuit 4 for suppressing frequencies above $2f$. In the present embodiment, this is done by designing the transformer 18 to cut off at $2f$ and attenuate higher frequencies.

The harmonic output filter 5 is added to suppress any unwanted components of the fundamental frequency $f$ or odd-order harmonics thereof which appear at the intermediate terminals 12 and 14. The filter 5 is unbalanced in form, with an input terminal 12, an output terminal 8, and a common terminal 15 which may be grounded. The filter 5 comprises a delay line 27 and two resistors $R_2$ and $R_3$ each having a resistance equal to the characteristic impedance of the line 27. The line 27 is an unbalanced structure with input and output terminals connected, respectively, to the corresponding terminals 12 and 8 of the filter, and a common input-output terminal 28. The line 27 has a lumped or distributed inductance between terminals 12 and 8 and a lumped or distributed capacitance to terminal 28 so proportioned that it has negligible transmission loss and a constant delay equal to $½f$. The resistor $R_2$ is connected between the terminals 8 and 28 to terminate the delay line 27, and $R_3$ is connected between the common terminal 28 of the line 27 and the common terminal 15 of the filter 5. The terminal 15 is connected to the intermediate terminal 14 and the output terminal 9. At all even-order harmonics of $f$, the input signal will be delayed by the line 27 for an integral number of periods. Therefore, the voltage drops in the resistors $R_2$ and $R_3$ will be in phase and additive. Thus, the second harmonic frequency $2f$ will be freely passed by the filter 5. The filter will also pass higher even-order harmonics, but those above $2f$ are suppressed by the transformer 18. However, at the fundamental frequency $f$ and all odd-order harmonics, the line 27 will delay the input signal a half period or an integral number of periods plus a half period. Under these circumstances, the voltage drops in the resistors 2 and 3 will be 180 degrees out of phase and, since these voltages are equal, they will add to zero. Therefore, the filter 5 sharply suppresses all odd-order harmonics of $f$.

It is to be understood that the above-described arrangement is only illustrative of the application of the principles of the invention. Numerous other arrangements may be devised by those skilled in the art without departing from the spirit and scope of the invention.

What is claimed is:

1. A wave filter with attenuation peaks at the frequency $f$ and odd-order harmonics of $f$ having an input terminal, an output terminal, and a common input-output terminal and comprising a delay line and two resistors, the line having an input terminal, an output terminal, a common input-output terminal, negligible transmission loss, and a constant delay equal to $½f$, each of the resistors having a resistance equal to the characteristic impedance of the line, one of the resistors being connected between the output and the common terminals of the line, the other resistor being connected between the two common terminals, and the input and output terminals of the line being connected, respectively, to the input and output terminals of the filter.

2. In combination, a source of signals including a component of the frequency $2f$ and undesired components of the frequency $f$ and odd-order harmonics of $f$ and a filter adapted to transmit the frequency $2f$ while suppressing the undesired components comprising a three-terminal delay line having negligible transmission loss and constant delay equal to $\frac{1}{2}f$ and two resistors each equal in value to the characteristic impedance of the line, one of the resistors being connected to the output terminals of the line to terminate the line, and the other resistor and the source being connected in series between the input terminals of the line.

References Cited in the file of this patent

UNITED STATES PATENTS

| | | |
|---|---|---|
| 1,815,141 | Crouse | July 21, 1931 |
| 1,924,486 | Crouse | Aug. 29, 1933 |
| 2,117,752 | Wrathall | May 17, 1938 |
| 2,277,809 | Wrathall | Mar. 31, 1942 |
| 2,420,213 | Walker | May 6, 1947 |
| 2,465,407 | Varela | Mar. 29, 1949 |
| 2,465,840 | Blumlein | Mar. 29, 1949 |
| 2,605,358 | Neher | July 29, 1952 |
| 2,855,573 | Fredendall | Oct. 7, 1958 |